United States Patent [19]

Araki et al.

[11] 4,144,155

[45] Mar. 13, 1979

[54] RADIATION PROCESS FOR PRODUCING A REACTIVE AQUEOUS EMULSION

[75] Inventors: Kunio Araki, Takasaki; Keizo Makuuchi, Sakai; Tohru Takagi, Takasaki; Hiroyuki Nakayama, Kanagawa, all of Japan

[73] Assignees: Japan Atomic Energy Research Institute, Tokyo; Kansai Paint Co., Ltd., Amagasaki, both of Japan

[21] Appl. No.: 824,819

[22] Filed: Aug. 15, 1977

[51] Int. Cl.² ............................................... C08F 2/46
[52] U.S. Cl. ........................... 204/159.22; 204/159.16; 260/836; 260/837 R; 260/29.6 Ta; 526/271; 526/272; 526/273
[58] Field of Search .................. 260/29.6 TA; 204/159.22; 526/271, 272, 273

[56] References Cited

U.S. PATENT DOCUMENTS

| | | | |
|---|---|---|---|
| 2,787,561 | 4/1957 | Sanders | 117/232 |
| 3,073,806 | 1/1963 | Reinhard | 260/78.5 |
| 3,083,171 | 3/1963 | Aronoff et al. | 260/29.4 |
| 3,666,645 | 5/1972 | Ronsohoff | 204/159.22 |
| 3,701,679 | 10/1972 | Johnson et al. | 117/93.31 |
| 3,716,524 | 2/1973 | Cenci | 260/78.5 |

*Primary Examiner*—Richard B. Turer
*Attorney, Agent, or Firm*—Flynn & Frishauf

[57] ABSTRACT

A process for producing a reactive aqueous emulsion comprising dispersing a monomer mixture of (a) 65.0 – 98.8% by weight of radical polymerizable hydrophobic ethylenic unsaturated monomer having one ethylenic unsaturated bond, (b) 1.0 – 30.0% by weight of radical polymerizable ethylenic unsaturated monomer having a glycidyl group and (c) 0.2 – 5.0% by weight of a radical polymerizable ethylenic unsaturated monomer having a carboxylic group in water by virtue of a restricted amount of surface active agent and irradiating with an ionizing radiation for a total dose of more than 0.01 Mrad at temperatures ranging from $-5°$ C. to $50°$ C. This reactive aqueous emulsion does not contain low-molecular water-soluble compounds such as a radical polymerization initiator, a pH regulator, etc. and can form a film having improved properties.

5 Claims, No Drawings

RADIATION PROCESS FOR PRODUCING A REACTIVE AQUEOUS EMULSION

BACKGROUND OF THE INVENTION (1) Field of the Invention

This invention relates to a process for producing a reactive aqueous emulsion.

(2) Description of the prior art

Increasing social demands for the prevention of environmental pollution and the saving of resources have tended to restrict the use of organic solvents in recent years. Therefore, the availability of polymer emulsions using water as a medium has been noted in fields formerly using large amounts of organic solvents, such as coatings, adhesives and so forth. Various kinds of emulsions have been conventionally developed; however, these emulsions were produced by the heating emulsion polymerization method using water-soluble radical polymerization initiators (hereinunder referred to as "initiator-using polymerization"). Since the emulsion obtained by initiator-using polymerization contains low-molecular water-soluble compounds, such as a radical polymerization initiator, pH regulator, surface active agent and so forth, which adversely affect the properties of a film obtained from the emulsion and since the diameter of the particles of the emulsion is large, the emulsion lacks stability, and the denseness and smoothness of the film obtained are inferior. Therefore, the film obtained from the conventional emulsion possesses the disadvantages of low resistance to water, solvents and chemicals, and poor mechanical properties.

In order to eliminate the defects of the conventional polymer emulsion as stated above, an emulsion into which a reactive group is introduced and which can be crosslinked during the film-forming step has been proposed. For example, an emulsion containing a glycidyl group which reacts with a crosslinking agent to effect crosslinking in the film obtained from the emulsion to improve the properties of the film has been proposed in the initiator-using polymerization field. However, the disadvantage of low water-resistance caused by the large amount of low-molecular water-soluble compounds contained in the conventional emulsion could not be improved sufficiently even by the proposal and the proposal suffers in that the degree of crosslinking is lowered because of the inactivation of the glycidyl group in emulsion polymerization. When an unsaturated monomer containing a glycidyl group is used in amounts required for crosslinking between polymer particles of the emulsion, the degree of crosslinking of the interior of the polymer particles is extremely low and the film obtained suffers from defects in solvent-resistance, chemical resistance; etc.; on the contrary, when the unsaturated monomer is used in amounts large enough to crosslink the interior of the polymer particles of the emulsion, an excess of crosslinking between the polymer particles occurs and the film obtained suffers from defects in mechanical properties. In addition, the use of a large amount of unsaturated monomer is uneconomical.

On the other hand, since the ionizing radiation emulsion polymerization process requires no water-soluble radical initiator, pH-regulator and so forth, the emulsion obtained hardly contains any low-molecular water-soluble compounds and the water-resistance of the film obtained from the emulsion is excellent. However, the conventional ionizing radiation emulsion polymerization process does not improve the defects in the balance of the properties of the film caused by the distribution of the degree of crosslinking of the inter-polymer particles and the intrapolymer particles of the emulsion prepared by the initiator process as stated above.

A process for producing an aqueous emulsion which can form a film having excellent water-resistance, solvent-resistance, chemical-resistance and mechanical-resistance has, therefore, long been desired by those skilled in the art.

SUMMARY OF THE INVENTION

In accordance with the present invention there is provided a process for producing a reactive aqueous emulsion comprising dispersing a monomer mixture of (a) 65.0–98.8% by weight of radical polymerizable hydrophobic ethylenic unsaturated monomer having one ethylenic unsaturated bond in its molecule (hereinafter referred to as "hydrophobic monomer"), (b) 1.0–30.0% by weight of radical polymerizable ethylenic unsaturated monomer having a glycidyl group required for the reaction with a crosslinking agent (hereinafter referred to as "monomer having a glycidyl group") and (c) 0.2–5.0% by weight of a radical polymerizable ethylenic unsaturated monomer having a carboxylic group which is necessary for the stability of the emulsion (hereinafter referred to as "a monomer having a carboxylic group") in water by using a restricted amount of surface active agent and irradiating with more than 0.01 Mrad of an ionizing radiation at temperatures ranging from $-5°$ C. to $50°$ C.

DETAILED DESCRIPTION OF THE INVENTION

This invention relates to a process for producing a reactive aqueous emulsion which can form a film having excellent water-resistance, solvent-resistance, chemical-resistance and mechanical properties, and more particularly to a process for preparing a reactive aqueous emulsion characterized by dispersing a monomer mixture of (a) a hydrophobic ethylenic unsaturated monomer, (b) an ethylenic unsaturated monomer having a glycidyl group and (c) an ethylenic unsaturated monomer having a carboxylic group in water, without the use of a substantial amount of low-molecular water-soluble compounds and irradiating with an ionizing radiation at a temperature of from $-5°$ C. to $50°$ C.

One of the most important features of this invention resides in that a low-molecular water-soluble compound such as a radical polymerization initiator, pH regulator, etc. are not required, and that the amount of the surface active agent used is extremely small. Therefore, an emulsion of this invention hardly contains any low-molecular water-soluble compounds, and accordingly, the water-resistance of the film obtained from the emulsion is excellent. Another important feature of this invention resides in that the large amount of hydroxyl group radical produced by the decomposition of water during irradiation with ionizing radiation acts as an initiator and stabilizes the polymer particles of the emulsion. Further important features are that since the process of this invention can be carried out at low temperatures, the agglomeration of the polymer particles is extremely slight in spite of the use of an extremely small amount of surface active agent and an emulsion the polymer particles of which are stable, dense, uniform and fine is produced in a high yield.

In the catalyst-used emulsion polymerization of a hydrophobic monomer with a monomer containing an epoxy group, a cleavage of the epoxy group occurs in the emulsion polymerization and the concentration of the epoxy group becomes extremely low. Accordingly, the crosslinking of the inter-polymer particles by virtue of the reactivities of an epoxy group does not take place sufficiently and, consequently, the properties of the film obtained, such as solvent-resistance, chemical-resistance, mechanical property, etc., are insufficient. However, according to this invention, there is no cleavage of the epoxy group and more than 98% of the epoxy groups contained in the epoxy group containing-monomer charged in polymerization are maintained.

A still more important feature of this invention is that the crosslinking of the interior of the polymer particles of the emulsion can take place at the time of the drying and film-forming step to form a dense and uniform film, by virtue of the reactivity of the epoxy group contained in the polymer particles of the emulsion. This crosslinking reaction can be made to take place by heating the emulsion at temperatures above 140° C., or it can be carried out at room temperature by adding a crosslinking agent to the emulsion. Since the polymer particles of an emulsion of this invention contain a cross-linking constituent, an emulsion can form a dense and uniform film having excellent water-resistance, chemical-resistance and solvent-resistance even if the amount of glycidyl group required for crosslinking is small. Further, no defect in mechanical property of the film caused by an excess of crosslinking of interpolymer-particles takes place. Furthermore, the conditions required for curing the film obtained from an emulsion of this invention are mild compared with those for a film obtained from that of conventional art, that is, lower temperatures and shorter time. Also, the amounts of the monomer containing a glycidyl group and cross-linking agent used by this invention are small.

The hydrophobic monomer (a) used in this invention is a radical polymerizable water-insoluble or slightly soluble-monomer having an ethylenic unsaturated group in its molecule and includes: acrylic esters such as methyl acrylate, ethyl acrylate, propyl acrylate, butyl acrylate, 2-ethylhexyl acrylate, lauryl acrylate, etc.; methacrylate ester such as methyl methacrylate, ethyl methacrylate, propyl methacrylate, butyl methacrylate, 2-ethylhexyl methacrylate, lauryl methacrylate, etc.; vinyl ester such as vinyl acetate, vinyl propionate, vinyl versatate*; styrene such as styrene, α-methylstyrene, vinyltoluene, chlorostyrene, etc. These hydrophobic unsaturated monomers are the main components of the film and are used independently or in combination with each other in this invention.

*Versatic Acid is a saturated synthetic tertiary monocarboxylic acid having $C_9$, $C_{10}$, and $C_{11}$ chain length.

The radical polymerizable monomer having a glycidyl group (b) used in this invention includes: glycidyl acrylate, glycidyl methacrylate, allyl glycidyl ether, equimolar adduct of "Epikote 828" or "Epikote 1001" (both are epoxy resins from Shell International Chemical Corp.) and (meth)acrylic acid, 1:1-2 mole adduct of "ShoDine 508" (epoxy resin sold by Showa Denko Co., Ltd.) and (meth)acrylic acid, and the like. These monomers (b) are used independently or in combination with each other in this invention. The amount of the monomer (b) used is from 1.0-30.0%, preferably from 5-15%, on the basis of weight of the total monomer mixture. When the amount is less than 1.0%, the degree of crosslinking of intra-polymer particles of the emulsion obtained is less than 5% and the properties of the film obtained from the emulsion such as water-resistance, solvent-resistance, chemical-resistance are not sufficient. When the amount is more than 30%, selective polymerization tends to occur in the emulsion polymerization in water and a stable emulsion of the small diameter polymer particles cannot be obtained.

The monomer having a carboxylic group (c) used in this invention includes acrylic acid, methacrylic acid, crotonic acid, itaconic acid and the like. The monomers are used independently or in combination with each other. The amount of the monomer (c) used is from 0.2-5.0%, preferably 0.4-2.5%, on the basis of the weight of the total monomer mixture. When the amount is less than 0.2, the selective polymerization of the monomer (c) in water increases and a stable emulsion the polymer particles of which have small diameter can not be obtained. When the amount is more than 5%, selective polymerization of the monomer (c) in the water is apt to occur and a stable emulsion, the polymer particles of which have small diameter, can hardly be produced.

When the emulsion contains a monomer having a glycidyl group in the radiation emulsion polymerization process, the crosslinking of the interior of the polymer particles occurs to the degree of 5-50%. Therefore, a crosslinkable monomer is required in order to effect the crosslinking of the interior of the polymer particles more effectively. This degree of crosslinking is obtained from the insolubles of the polymer in acetone. A polymer emulsion the degree of crosslinking of which is from 50 to 99% can be produced.

The crosslinkable monomer used in this invention is a radical polymerizable and/or radical copolymerizable compound having more than two reactive carbon-carbon double bonds or triple bonds in its molecule and is preferably lipophilic for more effective crosslinking of the interior of the polymer particles. Representative crosslinkable monomers are: glycol dimethacrylate such as polyethylene glycol dimethacrylate, polypropylene dimethacrylate, etc.; di or triacrylate or di or trimethacrylate of 1,1,1-trihydroxymethylethane, 1,1,1-trihydroxylmethylpropane and the like; tetramethacrylate or tetracrylate of pentaerythritol; triallyl cyanurate, triallyl isocyanurate triallyl trimellitate, etc.; divinylbenzene, di or tripropargylic acid ester, di or tripropionic acid ester, and the like. These crosslinkable monomers are used independently or in combination with each other. The amount of the crosslinkable monomer used is less than 10%, preferably less than 3%, on the basis of the weight of the total monomer mixture. When the amount is more than 10%, the degree of crosslinking is over 99% and the coalescence of polymer particles becomes increasingly difficult.

In accordance with this invention, the total monomer mixture of monomer (a), (b) and (c) is dispersed in water by virtue of a specific amount of surface active agent and irradiated with an ionizing radiation to form an emulsion.

The amount of the total unsaturated monomer mixture dispersed in the aqueous system is from 10%-65%, preferably 30-50%. Less than 10% is economically impractical. When the amount is more than 65%, a stable emulsion the polymer particles of which have small diameter can hardly be produced. The total unsaturated monomer mixture may be added at once to water before irradiation; or it may be employed to partition the total unsaturated monomer mixture into more than two fractions, and to add said fractions in water one by one while irradiating (multistage emulsion polymerization). It may also be added to water continuously while irradiating (dropping emulsion polymerization). And it is further possible to increase the concentration of the carboxylic group and glycidyl group on the surface of polymer particles to more than that in the central portion of the polymer particles by varying the composition of the unsaturated monomer mixture added during the multistage emulsion polymerization and the dropping emulsion polymerization.

The amount of surface active agent added to the monomer mixture is preferably from 0.05 to 10.0%, more preferably from 0.05 to 1.0%, on the basis of weight of the total monomer mixture. This is very small compared with the initiator-using polymerization. The surface active agents used in this invention are conventional ones, that is nonionic surface active agents such as polyethylene glycol nonlphenylether, polyethylene glycol dodecyl phenyl ether and the like, anionic surface active agents such as sodium lauryl benzenesulfonic acid, sodium dodecylbenzensulfonic acid and the like.

The ionizing radiation used in this invention may include an electron beam, alpha rays, beta rays, gamma rays or X-rays. The choice of radiation source and the total dose of the radiation depends on the components of the monomer used, the radiation atmosphere and temperature, the method for dispersing the total monomer mixture in water and the cost of the radiation apparatus. In general, the total dose of the radiation may range from 0.01 Mrad to 1.0 Mrad.

Since polymerization heat (reaction heat) is evolved when the emulsion polymerization is carried out by irradiating with an ionizing radiation in accordance with this invention, it is necessary to control the reaction temperatures within the range of preferably from $-5°$ C. to $50°$ C., more preferably from $0°-30°$ C., and when it rises above $50°$ C., an agglomeration of the polymer particles is apt to occur and a stable emulsion the polymer particles of which have a particular small diameter is hardly obtainable.

While the interior of the polymer particles of the aqueous polymer emulsion of this invention is highly crosslinked, the polymer emulsion has excellent film-forming properties, dispersal-stability and fluidity. When a crosslinking agent is added to the aqueous polymer emulsion of this invention, the crosslinking reaction between the polymer particles constituting said emulsion significantly increases and a film is produced, the water-resistance, chemical-resistance, solvent-resistance and toughness of which is highly improved.

The crosslinking agents used in this invention are amines and acids; the former is an amine having at least one primary amino group or more than two secondary amino groups in its molecule such as propylamine, monoethanolamine, ethylenediamine, hexamethylenediamine, diethylenetriamine, triethylenetetramine, tetraethylenepentamine, diethylaminopropylamine, N-aminoethylpiperazine, isophoronediamine, methaphenylenediamine and the like, and the latter is a compound having more than two hydroxyl groups in its molecule and illustrated by a polycarboxylic acid such as sebacic acid, succinic acid, adipic acid, phthalic acid, etc., phosphoric acid, phosphoric ester, sulfuric acid, sulfate and the like. The amount of the amine or acid used in this invention is preferably from 0.2 to 2.0 equivalent weights to one equivalent weight of glycidyl group.

The conditions for drying (curing) the aqueous polymer emulsion of this invention, that is, drying temperature and drying time, should be determined depending on the composition of the monomer mixture used, however, drying at room temperature for a period of from 1 to 24 hours can form a film having the desired excellent properties. The film-forming and curing time can be extremely shortened by drying the aqueous polymer emulsion at temperatures below $100°$ C.

Since the aqueous polymer emulsion can form a film the water-resistance, solvent-resistance, chemical-resistance, and mechanical property of which are significantly improved, it is available for use as a coating, adhesive, fibrous treating agent and the like.

Various kinds of auxiliaries, such as pigments, thickening agents, antiseptics, antifoamers, pH-adjustors, etc., may be added to the aqueous polymer emulsion of this invention before or after irradiation, if necessary.

This invention is further illustrated by the following Examples. However, this invention should not be limited by these examples, and changes and modifications within the spirit and scope of the claim can be effected.

EXAMPLE 1

Into a 3l four-necked flask equipped with a stirring rod, inlet for nitrogen gas, thermometer and cooling tube were added 1050 grams of deionized water and 0.9 gram of sodium laurylbenzenesulfonate. A monomer mixture of 270 grams of ethyl acrylate, 82 grams of methyl methacrylate, 90 grams of glycidyl methacrylate and 18 grams of acrylic acid was then added. The resulting mixture was irradiated with gamma rays from Co-60 for 4 hours at a dose rate of $5 \times 10^3$ rad/hr with agitation at $30°$ C. to produce an emulsion (hereunder referred to as Emulsion-A).

EXAMPLE 2

Into the same flask as used in Example 1 equipped with dropping funnel were added 800 grams of deionized water, 3 grams of sodium laurylbenzene sulfonate and 3 grams of polyethylene glycol nonylphenyl ether. The unsaturated monomer mixture having the following composition was added dropwise over a period of three hours at a dose rate of $3 \times 10^4$ rad/hr with agitation at $20°$ C. in an atmosphere of nitrogen gas. After addition of the unsaturated monomer mixture, the flask was irradiated with gamma rays from Co-60 for 2 hours at a dose rate of $3 \times 10^4$ rad/hr to produce an emulsion (hereunder referred to as Emulsion B).

| Unsaturated monomer mixture | grams |
|---|---|
| styrene | 48 |
| methyl methacrylate | 140 |
| n-butyl methacrylate | 140 |
| 2-ethylhexyl acrylate | 140 |
| ethyl acrylate | 140 |
| glycidyl methacrylate | 42 |
| glycidyl acrylate | 42 |
| methacrylic acid | 4 |
| acrylic acid | 4 |

EXAMPLE 3

The following monomer mixture was divided into three equal parts:

| monomer mixture | grams |
| --- | --- |
| vinyl propionate | 602 |
| allylglycidyl ether | 84 |
| methacrylic acid | 7 |
| acrylic acid | 7 |

Into the same flask as used in Example 1 were added 800 grams of deionized water, 3 grams of sodium dodecylbenzene sulfonate, 3 grams of polyethylene glycol nonylphenylether and one-third of the monomer mixture. The flask was then irradiated with gamma rays from Co-60 for 4 hours at a dose rate of $1.5 \times 10^5$ with agitation at 0° C. in an atmosphere of nitrogen gas (step 1). Another one-third of monomer mixture was then added into the flask and irradiation was carried out for 2 hours under the same conditions as that of step 1 (step 2), after which another one-third of monomer mixture was added and irradiated under the same conditions as that in step 2 to produce an emulsion (hereunder referred to as Emulsion C).

REFERENCE EXAMPLE 1

Into a 3l four-necked flask equipped with a stirring rod, inlet for nitrogen gas, dropping funnel, thermometer and cooling tube were added 1050 grams of deionized water, 4.5 grams of sodium laurylbenzene sulfonate and 1.5 grams of ammonium persulfate and then the monomer mixture used in Example 1 was added dropwise over a period of three hours while maintaining the reaction temperature in the flask at 70° C. with agitation in an atmosphere of nitrogen gas (step 1). After addition of the monomer mixture, a solution of 1 gram of ammonium persulfate in 50 grams of water was subjected to the reaction for 2 hours under the same conditions as that in step 1 to produce an emulsion (hereunder referred to as Emulsion R-1).

EXAMPLE 4

Into the same flask as that used in Example 1 were added 800 grams of deionized water, 180 grams of ethylacrylate, 117 grams of methyl methacrylate, 0.6 gram of divinylbenzene, 3 grams of glycidyl methacrylate, 0.3 gram of itaconic acid, 1.4 grams of sodium laurylbenzene sulfonate and 2.1 grams of polyethyleneglycol dodecylphenyl ether. The resulting mixture then irradiated with gamma rays from Co-60 for 2 hours at a dose rate of 0.02 Mrad/hr with agitation at 20° C. in an atmosphere of nitrogen gas (step 1). And 170 grams of ethyl acrylate, 76 grams of methyl methacrylate, 128 grams of n-butyl methacrylate, 24 grams of glycidyl methacrylate and 2 grams of acrylic acid were then added to the flask and irradiated with gamma rays for 2 hours under the same conditions as in step 1 to produce an emulsion (hereunder referred to as Emulsion D).

EXAMPLE 5

Three kinds of monomer mixtures were prepared as follows:

| | first step | second step | third step |
| --- | --- | --- | --- |
| ethyl acrylate | 180 | 180 | 250 |
| methyl methacrylate | 115 | 100 | 112 |
| glycidyl methacrylate | 3 | 10 | 30 |
| itaconic acid | 0.6 | 1 | 0 |
| methacrylic acid | 0 | 3 | 0 |
| acrylic acid | 0 | 0 | 8 |
| diethylene glycol- dimethacrylate | 1 | 0 | 0 |

Into the same flask as that used in Example 1 were added 1000 grams of deionized water, 4 grams of sodium laurylbenzene sulfonate, 6 grams of polyethylene glycol nonylphenylether and first step monomer mixture. The resulting mixture then irradiated with gamma rays from Co-60 for 2 hours at a dose rate of $2 \times 10^4$ rad/hr (step). The second monomer mixture was the added to the flask and irradiated with gamma rays under the same conditions as those in step 1. Lastly, the third step monomer mixture was added and irradiated with gamma rays for 2 hours under the same conditions as those in step 1 to produce an emulsion (hereunder referred to as Emulsion E).

REFERENCE EXAMPLE 2

Into the same flask as that used in Example 4 were added 700 grams of deionized water, 4 grams of sodium laurylbenzene sulfonate and 10 grams of polyethylene glycol dodecylphenylether. Then 1.5 grams of ammonium persulfate were added while maintaining the temperature at 70° C. with agitation in an atmosphere of nitrogen gas. Then, the monomer mixture of 180 grams of ethyl acrylate, 117 grams of methyl methacrylate, 0.6 gram of benzene-sulfonate, 3 grams of glycidyl methacrylate and 0.3 gram of itaconic acid was added dropwise to the flask over a period of 2 hours. After addition of the monomer mixture, 30 grams of 5% water solution of ammonium persulfate were added and the reaction was allowed to continue for 2 hours. A monomer mixture of 170 grams of ethyl acrylate, 76 grams of methylmethacrylate, 128 grams of butyl methacrylate, 24 grams of glycidyl methacrylate and 2 grams of acrylic acid and 40 grams of 5% water solution of ammonium persulfate were then added to the flask and the reaction was allowed to continue at 70° C. for 2 hours, after which 30 grams of 5% water solution of ammonium persulfate were added and the reaction was allowed to continue for 3 hours to produce an emulsion (hereunder referred to as Emulsion R-2).

EXAMPLE 6

This example was carried out to demonstrate the superiority of various properties of emulsions of this invention over those of conventional emulsions.

Testing methods employed (a) Agglomerate: naked eye
(b) Nonvolatile content: ASTM D2832-69
(c) Viscosity: ASTM D2196-68, 30 rpm
(d) pH: ASTM-E70-68
(e) Diameter of Particle: electron microscope
(f) Residual monomer: percentage for charge monomer mixture charged by means of gas chromatography.
(g) Gel percent: $W_1$ g of film was boiled in acetone for 24 hours to obtain a dry weight of $M_2$g. Gel percent (%) was calculated from $(W_2/W_1) \times 100$.
(h) Residual epoxide: The emulsion was coated on a glass plate and dried at room temperature for 7 days to obtain a film. Residual epoxide (%) was calculated from the ratio of infrared absorption spectrum of the film at 910 $cm^{-1}$ and 3400$^{-1}$.
(i) Freeze resistance: ASTM D2243-68

The results obtained are shown in Table 1. In Table 1, samples A, B, C, D and E correspond to Emulsions A, B, C, D and E prepared in Examples Nos. 1-5, and samples R-1 and R-2 correspond to Emulsions R-1 and R-2 prepared in Reference Examples Nos. 1 and 2.

EXAMPLE 7

One-half mole equivalent of hexamethylenediamine based on the glycidyl group contained in Emulsions A, B, C, D, E, (R-1) and (R-2) were added into these Emulsions to prepare Emulsions A', B', C', D', E', (R-1)' and (R-2)'.

Emulsions A, B, C, D, E, (R-1) and (R-2) were coated on seven plates of glass and dried at 150° C. for 30 minutes to obtain a film 20μ thick. Water-resistance, alkali-resistance, acid-resistance and anti-xylol activity of the films thus obtained were determined.

Emulsions A', B', C', D', E', (R-1)' and (R-2)' were coated on seven glass plates and dried at room temperature for 4 days to obtain a film 20μ thick. Water-resistance, alkali-resistance, acid-resistance and anti-xylol activity of the films thus obtained were determined.

Emulsions A, B, C, D, E, (R-1) and (R-2) were coated on seven plates of tin and dried at 150° C. for 30 minutes to form a film 50μ thick and the film was isolated by mercury amalgam technique. Water-absorption, breaking-strength and elongation of the film thus isolated were determined.

Testing methods employed (j) Water-absorption: $W_1$ gram of the film isolated by this Example was left standing in distilled water at 20° C. for 4 days to obtain a weight $W_2$ gram. Water-absorption was calculated from $(W_2 - W_1)/W_1$.

(k) Water-resistance: A film was left standing in tap water at 40° C. for 20 days. Water resistance was determined by ASTM D714-56.

(l) Alkali-resistance: 0.2 cc of 0.1 N NaOH were dropped on the surface of the film and after 24 hours the film was rinsed to observe a change in the surface.

(m) Acid-resistance: 0.2 cc of 0.1 N $NH_4SO_4$ was dropped on the surface of the film and after 24 hours the film was rinsed to observe any change in the surface.

(n) Anti-xylol activity: The surface of the film was vigorously rubbed with xylene-containing gauze any change in the surface was observed.

(o) Breaking-strength: A film isolated by this Example (10 × 30 mm) was stretched by a tensile machine. Breaking-strength was determined based on strain and elongation at the breaking point.

(p) Elongation: determined by the same method as for Breaking-strength.

Table 1

| Property Sample | Agglomerate | Nonvolafile Content (%) | Viscosity (CCP) | pH | Diameter of particle (μ) | Residual monomer (%) | Gel percent (%) | Residual Epoxide (%) | Freeze Resistance |
|---|---|---|---|---|---|---|---|---|---|
| A | nil | 30.3 | 250 | 4.0 | 0.3> | 0.3 | 65 | 99 | 1.1 |
| B | " | 46.6 | 980 | 4.5 | 0.2> | 0.3 | 57 | 99 | 1.2 |
| C | " | 46.5 | 1050 | 4.7 | 0.3> | 0.3 | 35 | 99 | 1.0 |
| D | " | 46.4 | 960 | 4.9 | 0.2> | 0.2 | 72 | 99 | 1.4 |
| E | " | 49.9 | 3500 | 4.7 | 0.2> | 0.2 | 80 | 99 | 1.2 |
| (R-1) | " | 29.8 | 170 | 3.0 | 0.2-0.8 | 0.6 | 21 | 85 | 2.2 |
| (R-2) | " | 45.5 | 680 | 3.2 | 0.3-1.0 | 0.4 | 17 | 80 | 3.2 |

Table 2

| | Properties of the film obtained from the emulsion | | | | | | |
|---|---|---|---|---|---|---|---|
| | Water-absorption (%) | Water-resistance | Alkali-resistance | Acid-resistance | Anti-xytol resistance (time) | Breaking-strength (kg/cm$^2$) | Elongation (%) |
| A | 1.0 | O | O | 0 | 30 OK | 210 | 75 |
| B | 1.4 | F | O | O | 30 OK | 172 | 80 |
| C | 1.2 | F | O | O | 30 OK | 195 | 82 |
| D | 1.8 | O | O | O | 30 OK | 224 | 103 |
| E | 1.3 | F | O | O | 30 OK | 247 | 70 |
| (R-1) | 4.2 | D | spot | spot | 20 NO | 66 | 31 |
| (R-2) | 4.8 | D | spot | spot | 15 NO | 78 | 34 |
| A' | 1.1 | O | O | O | 30 OK | 188 | 68 |
| B' | 1.4 | F | O | O | 30 OK | 210 | 86 |
| C' | 1.3 | F | O | O | 30 OK | 236 | 95 |
| D' | 2.1 | O | O | O | 30 OK | 255 | 122 |
| E' | 1.5 | F | O | O | 30 OK | 306 | 106 |
| (R-1)' | 5.6 | D | spot | spot | 20 NO | 85 | 18 |
| (R-2)' | 5.2 | D | spot | spot | 20 NO | 97 | 26 |

O: good
D: Dense
MD: Medium dense
M: Medium
F: Few

We claim:

1. A process for producing a reactive aqueous emulsion comprising dispersing a monomer mixture of (a) from 65.0 to 98.8% by weight of a radical polymerizable hydrophobic ethylenic unsaturated monomer having one ethylenic unsaturated bond in its molecule and being selected from the group consisting of an acrylic ester, a methacrylic ester, a vinyl ester, styrene and mixtures thereof, (b) from 1.0 to 30.0% by weight of a radical polymerizable ethylenic unsaturated monomer having a glycidyl group and being selected from the group consisting of glycidyl acrylate, glycidyl methacrylate, allylglycidyl ether, an adduct of a compound having two glycidyl groups with acrylic acid or methacrylic acid, and mixtures thereof, and (c) from 0.2 to 5.0% by weight of a radical polymerizable ethylenic unsaturated monomer having a carboxylic group being selected from the group consisting of acrylic acid, methacrylic acid, crotonic acid, itaconic acid and mixtures thereof, in water and from 0.05 to 10.0% by weight of a surface active agent, and irradiating with a total dose of from 0.01 to 1.0 Mrad of an ionizing radiation to effect emulsion polymerization.

2. The process as defined in claim 1, wherein the amount of surface active agent is from 0.05 to 1.00% on the basis of the weight of the monomer mixture.

3. The process as defined in claim 1, wherein the ionizing radiation is selected from the group consisting of electron beam, alpha rays, beta rays, gamma rays and X-rays.

4. The process as defined in claim 1, wherein the monomer mixture contained in the resulting dispersion being from 10 to 65% by weight thereof.

5. The process as defined in claim 1, wherein the emulsion polymerization is carried out at a temperature from $-5°$ to $50°$ C.

* * * * *